(12) United States Patent
Tanaka et al.

(10) Patent No.: US 7,744,505 B2
(45) Date of Patent: Jun. 29, 2010

(54) HYDRAULIC PRESSURE CONTROL DEVICE FOR CONTINUOUSLY VARIABLE TRANSMISSION

(75) Inventors: Hiroyasu Tanaka, Atsugi (JP); Hideshi Wakayama, Hadano (JP); Shoichi Sekiguchi, Yokohama (JP); Katsumi Doihara, Atsugi (JP); Hideaki Sasaki, Ebina (JP); Azusa Shimoda, Okazaki (JP); Naohiro Hoshi, Atsugi (JP); Tatsuya Ozone, Atsugi (JP); Toshio Saitou, Atsugi (JP); Koji Dohi, Machida (JP)

(73) Assignee: JATCO Ltd, Fuji-shi (JP)

( * ) Notice: Subject to any disclaimer, the term of this patent is extended or adjusted under 35 U.S.C. 154(b) by 441 days.

(21) Appl. No.: 11/941,132

(22) Filed: Nov. 16, 2007

(65) Prior Publication Data
US 2008/0125284 A1    May 29, 2008

(30) Foreign Application Priority Data
Nov. 28, 2006  (JP) .............................. 2006-319805

(51) Int. Cl.
*B60W 10/02* (2006.01)
(52) U.S. Cl. .......................... 477/175; 477/44; 477/180
(58) Field of Classification Search ................... 477/44, 477/174, 175, 180
See application file for complete search history.

(56) References Cited
U.S. PATENT DOCUMENTS
5,082,096 A    1/1992  Yamashita et al.

| | | | |
|---|---|---|---|
| 7,192,383 B2* | 3/2007 | Shimada et al. | 477/45 |
| 7,261,672 B2* | 8/2007 | Frank et al. | 477/45 |
| 7,309,067 B2* | 12/2007 | Kita | 475/210 |
| 7,335,133 B2* | 2/2008 | Katou et al. | 477/167 |
| 7,445,572 B2* | 11/2008 | Kodama et al. | 474/28 |

FOREIGN PATENT DOCUMENTS

| | | |
|---|---|---|
| JP | H03-125032 A | 5/1991 |
| JP | H08-020256 A | 1/1996 |
| JP | H08-054030 A | 2/1996 |
| JP | 2000-130475 A | 5/2000 |
| JP | 2000-304127 A | 11/2000 |
| JP | 2001-084002 A | 3/2001 |
| JP | 2002-286055 A | 10/2002 |
| JP | 2002-295529 | 10/2002 |
| JP | 2004-100920 A | 4/2004 |

* cited by examiner

*Primary Examiner*—Ha D. Ho
(74) *Attorney, Agent, or Firm*—Global IP Counselors, LLP

(57) ABSTRACT

A hydraulic pressure control device is provided that that controls hydraulic pressure of a clutch supplying torque to a continuously variable transmission while the vehicle is stopped and in a running range. The hydraulic pressure control device has an control section that estimates a clutch engagement hydraulic pressure for changing the clutch from an engaged state to a disengaged state based the hydraulic fluid pressure acting on the clutch during the stopping of the rotational movement of a primary pulley of the continuously variable transmission, and then controls regulation of the hydraulic pressure to the clutch from an engaged state to a disengaged state, when the vehicle is stopped and in the running range, so that the torque from the engine does not rotate a secondary pulley of the continuously variable transmission.

3 Claims, 4 Drawing Sheets

HYDRAULIC PRESSURE CONTROL DEVICE FOR CONTINUOUSLY VARIABLE TRANSMISSION

CROSS-REFERENCE TO RELATED APPLICATIONS

This application claims priority to Japanese Patent Application No. 2006-319805, filed on Nov. 28, 2006. The entire disclosure of Japanese Patent Application No. 2006-319805 is hereby incorporated herein by reference.

BACKGROUND OF THE INVENTION

1. Field of the Invention

The present invention relates to an improvement for a hydraulic pressure control device for a continuously variable transmission. More specifically, the present invention relates to a hydraulic pressure control device that controls hydraulic pressure of a clutch supplying torque to a continuously variable transmission while the vehicle is stopped and in a running range.

2. Background Information

In conventional belt-type continuously variable transmissions, there is a technique for carrying out a so-called idle neutral control for improving standing time fuel consumption. When using the so-called idle neutral control, a forward or reverse clutch and a forward/reverse switching clutch are released to create a state similar to when the shift range is in the neutral range, and the drive load of the engine is reduced to achieve idle rotation during a vehicle stop in a state in which the shift range is maintained in the drive range or another running range. An example of the so-called idle neutral control is disclosed in Japanese Laid-Open Patent Application No. 2002-295529.

In a conventional idle neutral control, when the driver attempts to start moving from the idle neutral control, it is necessary to immediately engage a forward clutch or the like and create a state in which movement can be started. The clutch pressure in the idle neutral state must be accurately controlled and kept at a prescribed clutch pressure that is slightly lower than the pressure at which the clutch is engaged.

If the clutch pressure cannot be controlled and kept at this prescribed clutch pressure, there will be variations in the hydraulic system during idle neutral control, variations in the accuracy of the clutch components, and installation error variations. Thus, either resulting in a continuously variable transmission in which the clutch cannot be expected to maintain an engaged state and fuel consumption cannot be expected to be improved, or resulting in a continuously variable transmission that has reduced start-up performance in which the clutch pressure is reduced and time is required to start the movement.

Consequently, Japanese Laid-Open Patent Application No. 2002-295529 discloses a method in which a torque transmission point at which the clutch is engaged and torque begins to be transmitted is determined by learning from the prior engagement of the clutch. Specifically, a comparison is made between the clutch input rotational speed and the engine speed when the clutch is gradually engaged, and the clutch supply hydraulic pressure at the time that the clutch input rotational speed is lower than the engine speed by a prescribed rotational speed is determined to be the torque transmission point. The clutch supply hydraulic pressure is controlled and the idle neutral control is carried out so that the learned torque transmission point is maintained when the vehicle is stopped in the D range.

In view of the above, it will be apparent to those skilled in the art from this disclosure that there exists a need for an improved hydraulic pressure control device for a continuously variable transmission. This invention addresses this need in the art as well as other needs, which will become apparent to those skilled in the art from this disclosure.

SUMMARY OF THE INVENTION

However, it has been discovered that in the conventional idle neutral control, a sensor for detecting the input rotational speed of the clutch is necessary. This additional sensor increases costs and weight of the transmission. Also in the conventional idle neutral control, the freedom to select a desired layout may be compromised by the mounting location of the sensor.

Therefore, one object of the present invention is to provide a hydraulic pressure control device for a belt-type continuously variable transmission that can accurately estimate the torque transmission point of the clutch without providing a sensor for sensing the input rotational speed of the clutch.

In accordance with one aspect of the present invention, a hydraulic pressure control device is provided that basically comprises a hydraulic pressure regulating section, a rotational movement detecting section and a control section. The hydraulic pressure regulating section selectively supplies hydraulic pressure to a clutch operatively disposed between an engine and a continuously variable transmission to selectively transmit torque from the engine to a primary pulley of the continuously variable transmission. The rotational movement detecting section detects a rotational movement of the primary pulley when the hydraulic pressure acting on the clutch by the hydraulic pressure regulating section reaches a torque transmission point in which the clutch switches from an engaged state to a disengaged state such that the primary pulley stops rotating, and to output a signal during a change of the clutch from the engaged state to the disengaged state to indicate of the torque transmission point. The control section estimates a clutch engagement hydraulic pressure at which the clutch is switched to the disengaged state when a vehicle is stopped and in a running range based on the hydraulic pressure acting on the clutch by the hydraulic pressure regulating section when the rotational movement detecting section initially detects the torque transmission point. The control section further controls the hydraulic pressure to change the clutch from the engaged state to the disengaged state when the vehicle is stopped and in the running range, so that the torque from the engine does not rotate a secondary pulley of the continuously variable transmission via a drive belt wrapped around the primary pulley and the secondary pulley.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
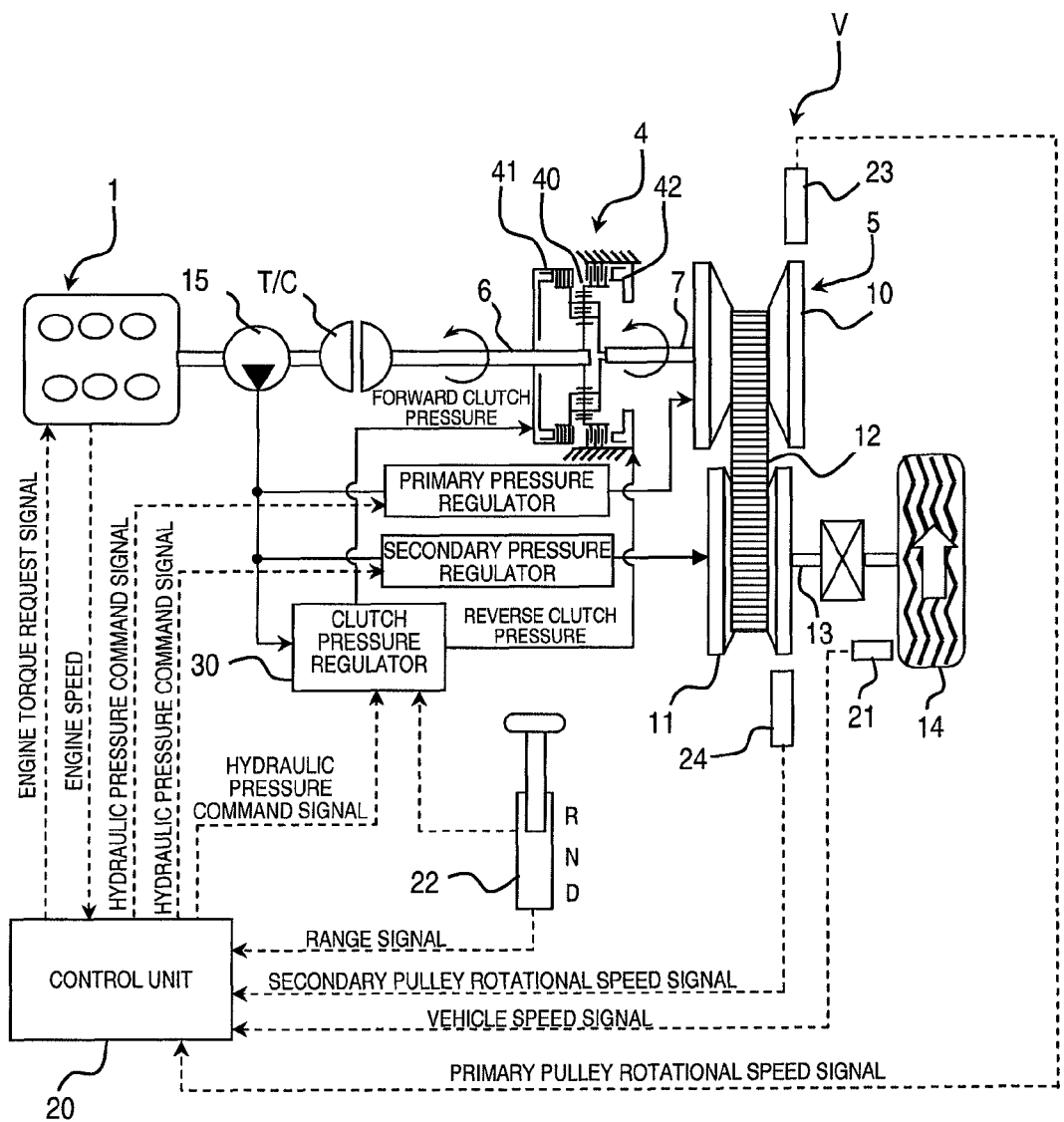
FIG. 1 is a simplified schematic view of a vehicle with an automatic transmission that is equipped with a hydraulic pressure control device in accordance with one embodiment of the present invention.

Referring initially to FIG. 1, a vehicle V is schematically illustrated that is equipped with an internal combustion engine 1, a forward/reverse switching mechanism 4 and a V-belt-type continuously variable transmission 5 that are controlled by a hydraulic pressure control device in accordance with one preferred embodiment of the present invention. In FIG. 1, the continuously variable transmission 5 is primarily configured from the forward/reverse switching mechanism 4 connected to an engine 1 by a driveshaft 6, and the continuously variable transmission 5 connected to an output shaft 7 of the forward/reverse switching mechanism 4. The continuously variable transmission 5 has a primary (input shaft-side) pulley 10 and a secondary (output shaft-side) pulley 11 connected to the output shaft 13. These variable pulleys 10 and 11 are operatively connected by a V-belt 12. The output shaft 13 is connected to a drive wheel 14 via an idler gear or a differential gear. A torque converter T/C or another such start-up element is disposed between the engine 1 and the input side of the forward/reverse switching mechanism 4. A hydraulic pump 15 is operatively coupled to the output shaft of the engine 1. The hydraulic pump 15 supplies hydraulic fluid to the forward/reverse switching mechanism 4 as discussed below.

A control unit 20 is provided that controls or sets a hydraulic pressure command value and sends a control command to a clutch pressure regulator 30 on the basis of driving actions and driving conditions such as a vehicle speed signal from a vehicle speed sensor 21, a range signal from an inhibitor switch 22 actuated by the shift lever, an engine speed signal from the engine 1 (or an engine control device), the rotational speed of the primary pulley 10 from a primary pulley rotational speed sensor 23, and the like. The inhibitor switch 22 selects, e.g., a forward or drive range (D range), a neutral position (N range), or a reverse range (R range) in response to movement of a shift lever by the driver. A secondary pulley rotational speed sensor 24 is also provided to detect the rotational speed of the secondary pulley 11. The vehicle speed sensor 21, the inhibitor switch 22, the primary pulley rotational speed sensor 23, and the secondary pulley rotational speed sensor 24 are operatively connected to send signals to the control unit 20. The forward range (D range) and the reverse range (R range) constitute running ranges of the vehicle.

As explained below, a clutch engagement hydraulic pressure is estimated by the control unit 20 using a pulse signal from the primary pulley rotational speed sensor 23 that detects the rotational movement of the primary pulley 10. It is therefore unnecessary to provide a sensor for sensing the input rotational speed of the forward/reverse switching mechanism 4. Thus, the arrangement of this embodiment makes it possible to reduce costs and weight as well as to prevent the freedom to select the desired layout from being compromised.

The control unit 20 preferably includes a microcomputer with a torque control program that controls the hydraulic pressure for controlling the forward/reverse switching mechanism 4 to transmit torque from the engine 1 to the primary pulley 10 as discussed below. The control unit 40 also controls engine torque and speed by controlling fuel injection amount to the engine 1 and throttle position. The control unit 40 can also include other conventional components such as an input interface circuit, an output interface circuit, and storage devices such as a ROM (Read Only Memory) device and a RAM (Random Access Memory) device. It will be apparent to those skilled in the art from this disclosure that the precise structure and algorithms for the control unit 40 can be any combination of hardware and software that will carry out the functions of the present invention.

In the forward/reverse switching mechanism 4, the power transmission path between the engine 1 and the primary pulley 10 is formed by a switching planetary gear set 40, a forward clutch 41 and a reverse clutch 42. When the vehicle travels forward, the forward clutch 41 is engaged and the reverse clutch 42 is released. When the vehicle travels in reverse, the reverse clutch 42 is engaged and the forward clutch 41 is released. When the vehicle is in a neutral position (neutral or park), the forward clutch 41 and the reverse clutch 42 are both released.

The engagement states of the forward clutch 41 and the reverse clutch 42 are controlled by the clutch pressure regulator 30. The clutch pressure regulator 30 supplies hydraulic fluid at a prescribed pressure to the forward clutch 41 and the reverse clutch 42 in accordance with a control command from the control unit 20. The clutch pressure regulator 30 adjusts the pressure of oil supplied to the forward clutch 41 and the reverse clutch 42, where the hydraulic pressure from the hydraulic pump 15 is assumed to be the initial pressure. The hydraulic pump 15 is connected to the input side or the like of the forward/reverse switching mechanism 4, and is driven by the engine 1.

The clutch pressure regulator 30 adjusts the pressure of oil supplied to the forward clutch 41 and the reverse clutch 42 in accordance with the hydraulic pressure command value, and engages or releases the forward clutch 41 and the reverse clutch 42.

The forward clutch 41 and the reverse clutch 42 are independently engageable. During forward movement (range signal=D range), forward clutch pressure is supplied to engage the forward clutch 41 is engaged, while the reverse clutch pressure is connected to the drain and the reverse clutch 42 is released. During rearward movement (range signal=R range), the forward clutch pressure is connected to the drain and the forward clutch 41 is released, while reverse clutch pressure is supplied and the reverse clutch 42 is engaged. In the neutral position (range signal=N range), the forward clutch pressure and the reverse clutch pressure are both connected to the drain, and the forward clutch 41 and the reverse clutch 42 are both released.

Figure 2:
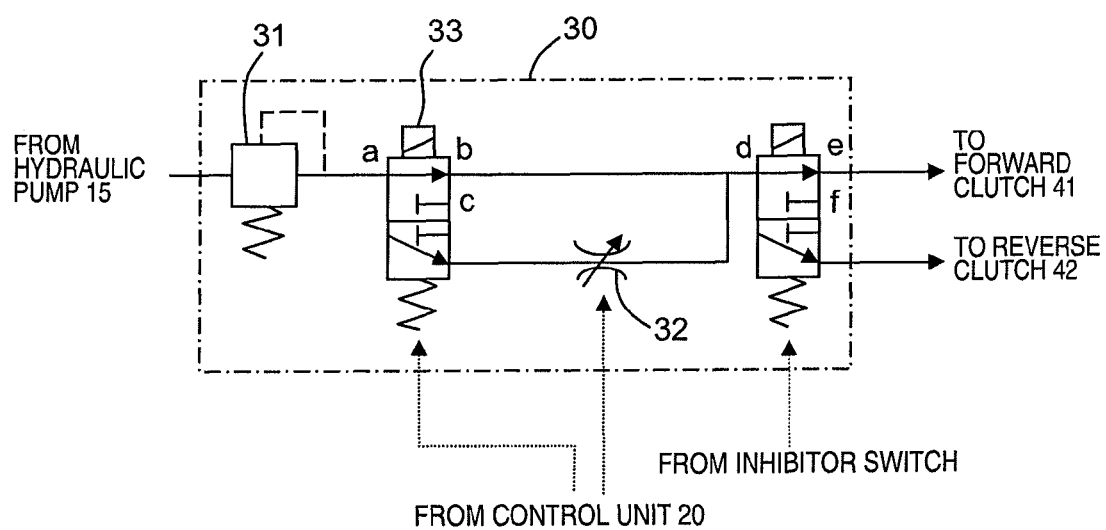
FIG. 2 is a block diagram of a clutch pressure regulator used in the automatic transmission with the hydraulic pressure control device of FIG. 1.

FIG. 2 is a view showing the structure of the clutch pressure regulator 30. The clutch pressure regulator 30 includes a regulator valve 31, a pressure control valve 32, a control valve 33 and a manual valve 34. The hydraulic fluid pressure of a hydraulic fluid supplied from the hydraulic pump 15 is adjusted by the regulator valve 31 to a prescribed initial hydraulic fluid pressure. The control valve 33 is provided for selecting between a case where the hydraulic fluid from the regulator 31 is supplied downstream at the initial pressure without further modification, and a case where the fluid is supplied after the pressure is reduced via the pressure control valve 32. The manual valve 34 is provided for selectively switching the flow of the hydraulic fluid from the control valve 33 to the forward clutch 41 or to the reverse clutch 42 in response to the operation of the shift lever. The pressure control valve 32 and the control valve 33 are controlled by a command signal from the control unit 20.

The gear ratio of the continuously variable transmission 5 or the contact frictional force of the V-belt is controlled by a pair of hydraulic pressure regulators that are actuated by a command from the control unit 20.

The primary pulley rotational speed sensor 23 faces an output gear (not shown) mounted on the primary pulley 10 for detecting the rotational speed of the primary pulley 10. Teeth are formed on the outer circumference of the output gear at equal intervals. Therefore, the output waveform detected by the primary pulley rotational speed sensor 23 is a pulse having a regular pitch at a constant vehicle speed. In other words, the primary pulley rotational speed sensor 23 is a pulse sensor that outputs a pulse signal in synchronization with the rotation of the primary pulley 10.

In a V-belt-type continuously variable transmission where a sensor for detecting the rotational speed of the forward clutch 41 or the reverse clutch 42 is not provided, it is impossible to determine changes in the neutral state based on the clutch rotational speed detected. Therefore, in the present embodiment, the neutral state (i.e., the state in which the forward clutch 41 or the reverse clutch 42 is disengaged) is detected using the pulse signal of the primary pulley rotational speed sensor 23 that detects the rotational speed of the primary pulley 10. Specifically, when the forward clutch 41 reduces pressure and reaches a prescribed torque capacity at which torque begins to be transmitted, a small amount of torsional torque is transmitted to the output side (engaged member side) of the forward clutch 41. Thus, a return torque that is proportional to the torsional deformation caused by the transmitted torque will be generated on the side of the engaged member (e.g., the output driveshaft 7) of the forward clutch 41. The primary pulley rotational speed sensor 23 will detect this torsional deformation, and a pulse signal will be output to the control unit 20. In other words, the engaged member (e.g., the output driveshaft 7) is twisted, and the primary pulley rotational speed sensor 23 detects this twisting and outputs a pulse signal to the control unit 20. Based on the input pulse signal, the control unit 20 learns the torque transmission point at which the forward clutch 41 begins to transmit torque. At this small amount of torsional torque, the tires do not rotate even if the drive shaft generates torsion or a return that is proportionate to the torsion.

Figure 3:
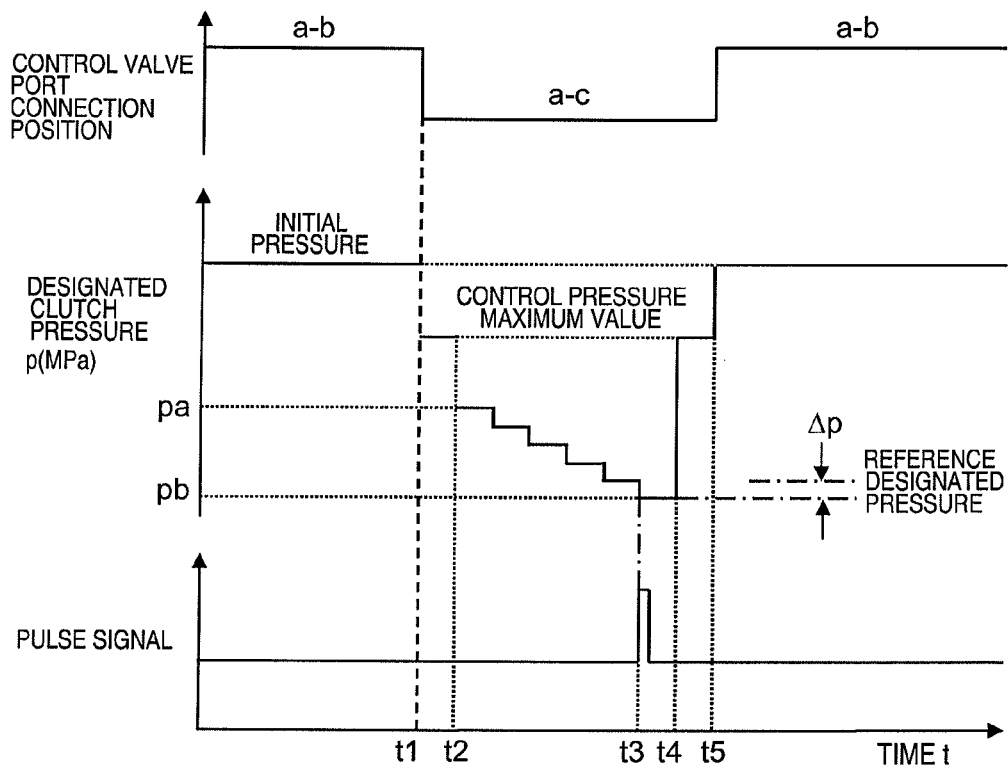
FIG. 3 is a timing chart showing an example of a control for learning the torque transmission point.

Next, the detection of the torque transmission point will be described using the timing chart in FIG. 3. As a precondition, it is assumed that the driver operates the brake pedal and stops the vehicle while the shift range is kept in the running range, i.e., the D range. Since the vehicle is stopped while in the D range, the initial pressure is acting on the forward clutch 41. At time t1, the control unit 20 switches the control valve 33 from this state, connects the ports a and c, and supplies hydraulic fluid to the pressure control valve 32. The pressure of the hydraulic fluid is temporarily kept at a maximum control value pressure for the control valve 33. This maximum control value pressure for the control valve 33 less than the initial pressure. The pressure of the hydraulic fluid is then brought to an even lower hydraulic fluid pressure pa at time t2. The hydraulic fluid pressure pa is a hydraulic fluid pressure at which the forward clutch 41 is not completely disengaged, or is partially engaged. The hydraulic fluid pressure pa is determined in advance by an experiment or the like. When the designated clutch pressure reaches pressure pa, the designated clutch pressure is further reduced from pressure pa in a stepwise fashion by a prescribed hydraulic fluid pressure.

The torque transmitted to the driveshaft 7 and connected to the output shaft 13 is then reduced. At the designated clutch pressure pb during time t3, the torsional deformation portion of the driveshaft 7 that accompanies the transmitted torque is returned to an undeformed or return state. The undeformed or return state is detected by the primary pulley rotational speed sensor 23, and the primary pulley rotational speed sensor 23 outputs a pulse signal to the control unit 20. It is thereby possible to detect that the forward clutch 41 has switched from the engaged state to the disengaged state at the designated clutch pressure pb. The designated clutch pressure pb maintained at the time of the switch to the disengaged state is the torque transmission point at which a switch occurs from the disengaged state to the engaged state.

When the pulse signal is detected, the designated clutch pressure is increased at time t4 to the maximum control value of the control valve 33. At time t5, the control valve 33 is switched, the ports a and b are connected, and hydraulic fluid is supplied at the initial pressure to the manual valve 34 without passing through the pressure control valve 32.

Such control can be used to detect the designated clutch pressure pb corresponding to the torque transmission point at which the forward clutch 41 is switched from the engaged state to the released (disengaged) state. The pressure difference $\Delta p$ is determined from the detected designated clutch pressure pb and a reference designated clutch pressure at which the forward clutch 41 is connected. The reference designated clutch pressure is a value that is stored in advance in the control unit 20. It is also possible to repeat the above-mentioned hydraulic fluid pressure control a plurality of times, and to use the results thereof to set the designated clutch pressure pb as the torque transmission point.

Figure 4:
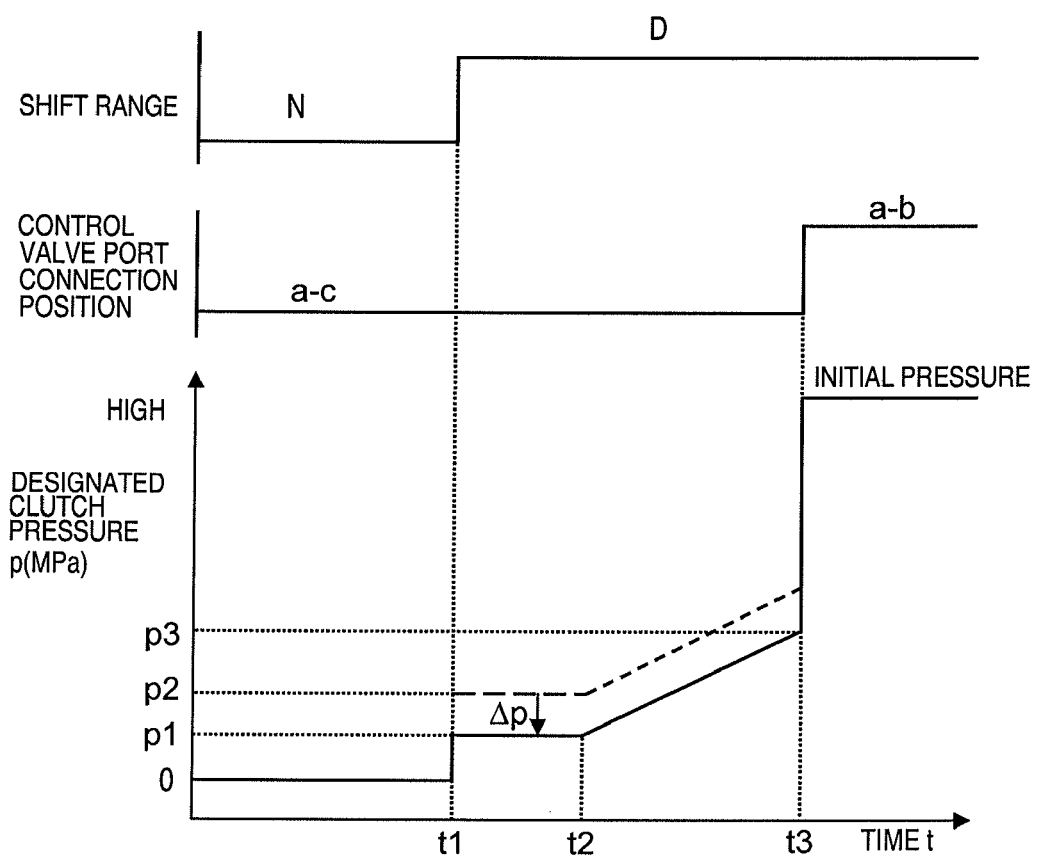
FIG. 4 is a timing chart showing the hydraulic fluid pressure control for the forward clutch during a shift change from the N range to the D range.

FIG. 4 is a timing chart showing the hydraulic fluid pressure control for the forward clutch 41 during a shift change from the N range to the D range. The hydraulic fluid pressure control is the same during a shift change from the N range to the R range.

The N range is selected until time t1, and the designated clutch pressure during this interval is controlled as 0 (zero) MPa. The maximum control value of the control valve 33 can be used as the designated clutch pressure to be maintained when the N range is selected. In this case, it is possible to expect an effect whereby the pressure can be quickly brought to the target hydraulic fluid pressure p1 maintained at the time of the switch to the R range described below.

The range is switched to the D range at time t2, and the designated clutch pressure is changed to the initial designated pressure p1 that is maintained when the forward clutch 41 is engaged. An initial hydraulic fluid pressure p2 is maintained when the forward clutch 41 is engaged. The initial hydraulic fluid pressure p2 is stored in advance in the control unit 20. However, the initial hydraulic fluid pressure p2 is corrected by $\Delta p$ and the initial designated pressure p1 is set, where $\Delta p$ is the difference between the reference designated clutch pressure and the actual designated clutch pressure that is maintained when the forward clutch 41 is engaged as shown in FIG. 3.

The clutch hydraulic pressure is controlled at pressure p1 as the designated clutch pressure pb, the forward clutch 41 begins to be engaged, and the designated clutch pressure p is increased in a stepwise fashion from time t2. When the hydraulic fluid pressure reaches a prescribed hydraulic fluid pressure p3, control is carried out so that the connection ports of the control valve 33 are switched and hydraulic fluid is supplied to the forward clutch 41 at the initial pressure.

Therefore, in the illustrated embodiment, a hydraulic pressure control device is provided that basically comprises hydraulic pressure control device is provided that basically comprises the clutch pressure regulator 30 constituting a hydraulic pressure regulating section, the primary pulley rotational speed sensor 23 constituting a rotational movement detecting section and the control unit 20 constituting a control section. The clutch pressure regulator 30 (hydraulic pressure regulating section) selectively supplies hydraulic pressure to the clutch 41 which is operatively disposed between the engine and the continuously variable transmission 5 to selectively transmit torque from the engine 1 to the primary pulley 10 of the continuously variable transmission 5.

The primary pulley rotational speed sensor 23 (rotational movement detecting section) detects rotational movement of the primary pulley 10 of the continuously variable transmission 5 when the hydraulic pressure acting on the clutch 41 by the clutch pressure regulator 30 (hydraulic pressure regulating section) reaches a torque transmission point in which the switches from an engaged state to a disengaged state such that the primary pulley 10 stops rotating, and outputs a signal during a change of the clutch 41 from the engaged state to the disengaged state so that the signal is indicative of the torque transmission point. Therefore, it is possible to estimate the designated torque pressure at which the clutch begins to transmit torque, without providing a sensor for detecting the input rotational speed of the clutch. It is also possible to estimate, based on the engagement hydraulic fluid pressure (designated pressure) of the clutch when a pulse signal is detected, the engagement hydraulic fluid pressure at which the clutch is switched to an engaged state. It is therefore possible to set the designated clutch pressure while taking into consideration variations in the hydraulic system, variations in the accuracy of the clutch components, and installation error variations.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A hydraulic fluid pressure control device comprising:
   a hydraulic pressure regulating section that selectively supplies hydraulic pressure to a clutch operatively disposed between an engine and a continuously variable transmission to selectively transmit torque from the engine to a primary pulley of the continuously variable transmission;
   a rotational movement detecting section that detects a rotational movement of the primary pulley when the hydraulic pressure acting on the clutch by the hydraulic pressure regulating section reaches a torque transmission point in which the clutch switches from an engaged state to a disengaged state such that the primary pulley stops rotating, and that outputs a signal during a change of the clutch from the engaged state to the disengaged state to indicate the torque transmission point; and
   a control section that estimates a clutch engagement hydraulic pressure at which the clutch is switched to the disengaged state when a vehicle is stopped and in a running range based on the hydraulic pressure acting on the clutch by the hydraulic pressure regulating section when the rotational movement detecting section initially detects the torque transmission point,
   the control section further controls the hydraulic pressure to change the clutch from the engaged state to the disengaged state when the vehicle is stopped and in the running range, so that the torque from the engine does not rotate a secondary pulley of the continuously variable transmission via a drive belt wrapped around the primary pulley and the secondary pulley.

2. The hydraulic fluid pressure control device according to claim 1, wherein
   the control section is further configured to repeat estimating of the clutch engagement hydraulic pressure for a prescribed number of times prior to setting a final value for the clutch engagement hydraulic pressure.

3. A hydraulic pressure control method comprising:
   selectively supplying hydraulic pressure to a clutch operatively disposed between an engine and a continuously variable transmission to selectively transmit torque from the engine to a primary pulley of the continuously variable transmission;
   detecting rotational movement of the primary pulley when the hydraulic pressure acting on the clutch reaches a torque transmission point in which the clutch switches from an engaged state to a disengaged state such that the primary pulley stops rotating;
   outputting a signal during a change of the clutch from the disengaged state to the engaged state so that the signal indicates the torque transmission point in which initial movement of the primary pulley of the continuously variable transmission occurs;

estimating a clutch engagement hydraulic pressure at which the clutch is switched to the from the engaged state to disengaged state when the vehicle is stopped and in the running range based on the hydraulic pressure acting on the clutch when the signal is initially detected indicating the torque transmission point; and controlling the hydraulic pressure to the clutch to a designated pressure that is no greater than the clutch engagement hydraulic pressure corresponding to the torque transmission point, when the vehicle is stopped and in the running range based on the clutch engagement hydraulic pressure that was estimated so that the torque from the engine does not rotate a secondary pulley of the continuously variable transmission via a drive belt wrapped around the primary pulley and the secondary pulley.

* * * * *